(12) United States Patent
Gleizer et al.

(10) Patent No.: US 8,133,162 B2
(45) Date of Patent: Mar. 13, 2012

(54) ROLL, AS WELL AS A RING FOR SUCH A ROLL

(75) Inventors: Jorge Gleizer, Bandhagen (SE);
Menderes Kayhan, Tumba (SE);
Jan-Erik Karlsson, Tyresö (SE)

(73) Assignee: Sandvik Intellectual Property AB, Sandviken (SE)

( * ) Notice: Subject to any disclaimer, the term of this patent is extended or adjusted under 35 U.S.C. 154(b) by 1150 days.

(21) Appl. No.: 11/447,281

(22) Filed: Jun. 6, 2006

(65) Prior Publication Data
US 2006/0287176 A1 Dec. 21, 2006

(30) Foreign Application Priority Data

Jun. 17, 2005 (SE) ...................... 0501387

(51) Int. Cl.
*B22D 11/06* (2006.01)
(52) U.S. Cl. .............. 492/47; 492/40; 492/45; 492/39
(58) Field of Classification Search ............ 492/47, 492/38, 40, 45, 39
See application file for complete search history.

(56) References Cited

U.S. PATENT DOCUMENTS

| 701,841 | A | * | 6/1902 | Chandler | 223/28 |
| 1,889,525 | A | * | 11/1932 | Barber | 271/273 |
| 3,616,671 | A | | 11/1971 | Notari | |
| 4,932,111 | A | | 6/1990 | Kark | |
| 5,613,546 | A | * | 3/1997 | Delassus et al. | 164/428 |
| 5,735,788 | A | | 4/1998 | Yasutake et al. | |

FOREIGN PATENT DOCUMENTS

| DE | 10244379 | 4/2004 |
| EP | 0 343 440 B1 | 11/1989 |
| JP | 2001-314906 | 11/2001 |
| JP | 2002-153904 | 5/2002 |

* cited by examiner

*Primary Examiner* — David Bryant
*Assistant Examiner* — Christopher Besler
(74) *Attorney, Agent, or Firm* — Morgan, Lewis & Bockius LLP

(57) ABSTRACT

A ring, preferably in the form of a lock nut, made for combi rolls, which ring includes at least one spring device in which a mechanical compression spring is included that acts between, on one hand, a front press body that is movable to and fro in order to constantly forward a spring force generated by the compression spring and, on the other hand, a support body, which may assume a fixed position, but which is adjustably movable by way of a screw in order to alter the tension in the compression spring.

11 Claims, 2 Drawing Sheets

ROLL, AS WELL AS A RING FOR SUCH A ROLL

FIELD OF THE INVENTION

The present invention relates to a roll of the kind that comprises a drivable roll shaft and two axially spaced-apart stop rings, one of which is fixed, and the other one is a lock nut, a plurality of other rings, of which one or more are roll rings, being mounted between the stop rings.

BACKGROUND

Rolls of the type generally mentioned above, are referred to as combi rolls by those skilled in the art. In practice, such rolls are used for hot or cold rolling of long narrow products of metal, such as wires, bars, pipes, etc. For such purposes, the roll ring or rings, i.e., the very rings which, in contrast to spacer rings and the like, carry out the forming of the metals are formed with a number of circumferential grooves, usually having a semi-circular cross section shape.

An important factor for a prolonged proper function of such rolls is that the different roll and spacer rings are rotationally secured in relation to each other and in relation to the roll shaft in a reliable way, since extremely large torques are to be transferred from the shaft to the rings without the same slipping in relation to each other. To overcome this problem, tightening devices are used, which may be divided into two main categories, viz. on one hand devices, which utilize the spring force of mechanical springs, and on the other hand, hydraulically acting devices. Of these devices, the last-mentioned ones are less suitable for many reasons, e.g., the necessity to providing expensive hydraulic oil conduits to the rotating roll, the risk of oil leakage, etc. Therefore, mechanical springs are preferable, in so far that they are technically less complicated, as well as easier and more inexpensive to manufacture, install and use.

In the technique in question, many proposals of mechanical springs for combi rolls have come up. One of these proposals is disclosed in U.S. Pat. No. 5,735,788, and is based on the use of a Belleville spring in the set of dismountable rings of the roll shaft. However, this solution has not been successful, among other things dependent on the placing of the spring inside the set of roll rings and spacer rings, and because of fatigue problems. It is true that the tension or the spring force of the Belleville spring in question should be possible to readjust, viz. by way of a set screw, but as a consequence of the placing thereof inside the set of dismountable rings, the spring is continuously exposed to forces, which deform, more precisely flatten the spring, something which fairly fast results in a slackening or fatigue to such an extent that the spring looses the ability to instantaneously, during operation, keep the rings pressed against each other with such a force in the friction joints there between, that the same do not slip. Furthermore, the inclined spring wears against adjacent rings in such a way that these become worn in a fairly short time due to the fact that the spring has a (circular) line contact and not a surface contact, with the rings.

SUMMARY

The present invention aims at obviating the above-mentioned disadvantages of not only the roll presented in U.S. Pat. No. 5,735,788, but also other rolls, which make use of mechanical springs, and at providing an improved roll. Therefore, in a first aspect, a primary object of the invention is to provide a roll having a mechanically acting spring device, which can apply to the dismountable rings of the roll a high spring pressure or a high degree of prestress, with the purpose of avoiding slipping between the rings during operation, and which furthermore in a simple way can compensate the inevitable deformation, which constantly arise in the rings during operation (because of wear and deformation of the material in the same), so that the high degree of prestress is guaranteed for the instantaneous transfer of torque between the rings. An additional object is to provide a roll, the roll width (the axially available space between the fixed stop ring and the lock nut) of which is utilized in an optimal way by not being occupied by any space-demanding spring devices. Yet an object of the invention is to provide a roll in which service in respect of the spring prestress of the rings may be made in a simple and fast way.

According to a first aspect, a roll comprises a drivable shaft and two axially spaced-apart stop rings. One of the stop rings is fixed and the other of the stop rings is a lock nut. A plurality of other rings are included. One or more of the other rings is mounted between the stop rings, wherein at least one of the stop rings comprises a spring device. The spring device is housed in a through hole extending axially and opening in opposite end surfaces of the ring. A mechanical compression spring acting between a front press body that is movable through an opening of the hole in order to constantly pass on a spring force generated by the compression spring to a ring and a support body. The support body during operation of the roll assumes a fixed position in relation to the ring. The support body being adjustable when not in operation by way of an adjusting member to alter the tension of the compression spring.

In a second aspect, the invention relates to a ring as such made with built-in spring functions, and intended for the roll according to the invention. An important object of the invention in this aspect is to provide a ring, in particular in the form of a lock nut, in which one or more spring devices are included, which, on one hand, has such a great working range that considerable deformation in the different rings of the roll can be compensated for, and, on the other hand, instantaneously, during operation, provide the rings with a high, dynamic degree of prestress in order to avoid the risk of slipping. An additional object is to provide a ring made with spring functions, which ring can be mounted on and dismounted from a roll shaft in a simple way, and which furthermore is made in such a way that the active spring force of the spring devices can be adjusted in a simple and ergonomically expedient way.

In a third aspect, a ring for a roll comprises a spring device housed in a through hole extending axially and opening into opposite end surfaces of the ring. A mechanical compression spring acts between a front press body that is movable through an opening of the hole in order to constantly pass on a spring force generated by the compression spring and a support body which may assume a fixed position in relation to the ring, but which is adjustably movable by way of an adjusting member in order to alter the tension of the compression spring.

The invention is based on the idea of building in into a ring mountable on a roll shaft, in particular a stop ring in the form of a lock nut, a spring device in which a mechanical compression spring is included, which acts between, on one hand, a front press body, which is movable to and fro, in order to constantly pass on a spring force generated by the compression spring towards the other rings and, on the other hand, a support body which during the operation of the roll assumes a fixed position in relation to the ring, but which out of operation is adjustably movable by way of an adjusting member in order to alter the tension in the compression spring.

Advantageously, a plurality of peripherically spaced-apart spring devices of this type is arranged in a circular rim formation along the ring.

BRIEF DESCRIPTION OF THE DRAWINGS

In the drawings:

FIG. 2 is an enlarged cross-section through a ring in the form of a lock nut included in the roll, in which a spring device according to the invention is built-in.

DETAILED DESCRIPTION

Figure 1:
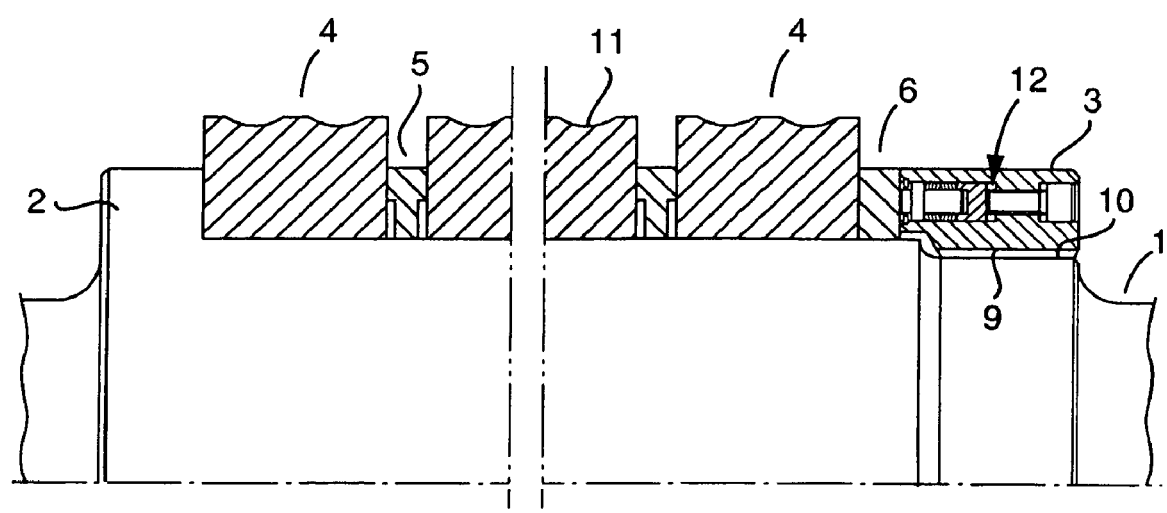
FIG. 1 is a partial longitudinal section through a roll according to the invention.

In FIG. 1, a combi roll is shown, which in a conventional way includes a drivable shaft or roll shaft 1 having two axially spaced-apart stop rings 2, 3, one of which, viz. the stop ring 2, is fixed, while the other one is a lock nut 3, which is dismountable from the shaft. In the example, the fixed stop ring 2 is in the form of a ring-shaped shoulder integrated with the rest of the shaft. However, it is also feasible to make the fixed stop ring 2 in the form of a separate, dismountable ring, which in a suitable way is axially locked in relation to the shaft.

Figure 2:
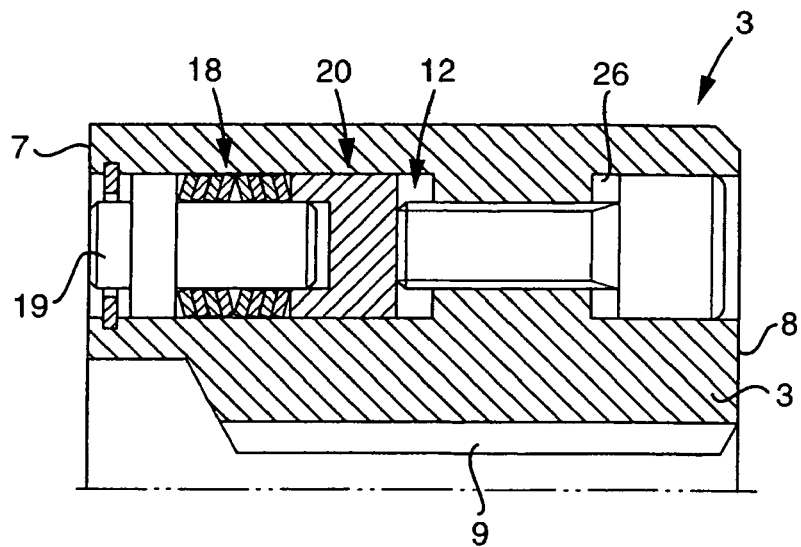
Figure 3:
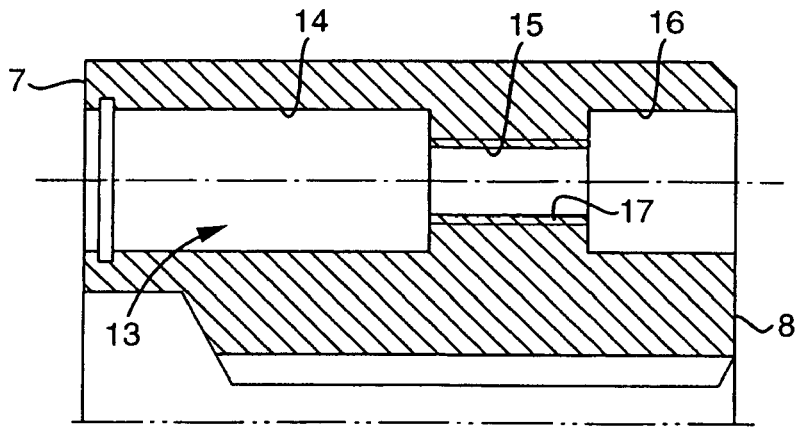
FIG. 3 is a cross section showing only a hollow space in which the spring device is mounted.

Between the fixed stop ring 2 and the detachable lock nut 3, a number of dismountable rings is arranged, of which certain are roll rings 4, and certain are spacer rings 5. Between the lock nut 3 and the roll ring 4 positioned closest to the same, there is an additional ring 6, the design of which may deviate from the design of the spacer rings 5, and which below is referred to as tightening ring. Generally, the roll shaft 1 as well as the different rings have a rotationally symmetrical, more precisely cylindrical, basic shape, the rings being delimited by planar end contact surfaces. Of the end surfaces, only the opposite end surfaces of the lock nut 3 are provided with reference designations 7, 8, as is seen in FIGS. 2 and 3. On the cylinder-shaped inside thereof, the lock nut (see FIG. 1) is formed with a female thread 9 that is in engagement with a male thread 10 of the roll shaft. The roll rings 4, which have the purpose of providing the direct roll forming work, and which for this purpose have circumferential, peripheral grooves 11, may advantageously be manufactured from cemented carbide or other wear-resistant materials, while the intermediate rings 5, 6 may be composed of a softer metal, e.g., steel or cast iron. However, the material in the different rings is incidental for the realization of the invention. The essential thing is that the friction joints in the interfaces between the end surfaces of the rings efficiently prevent slipping between the rings. For this purpose, the rings have to be held sustainedly compressed by a great spring force or prestress.

Figure 4:
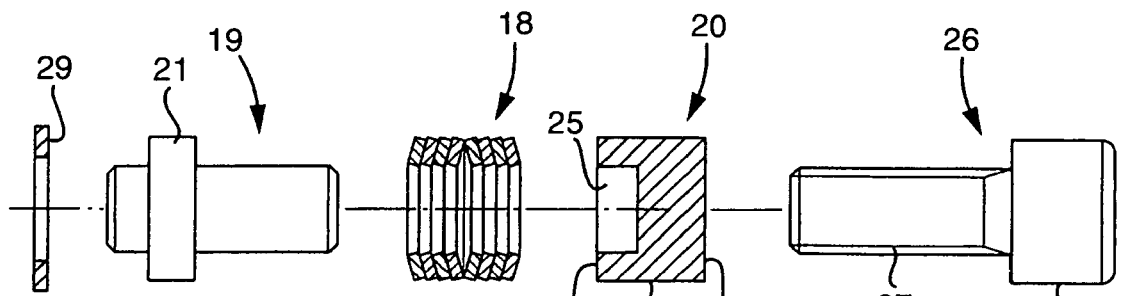
FIG. 4 is an exploded view showing the different components included in the spring device.
Figure 5:
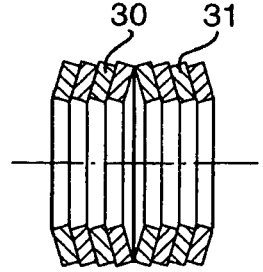
FIG. 5 is an enlarged section of a compression spring included in the spring device.

FIGS. 2-5 illustrate in detail the nature of a spring device 12 which is built-in into the lock nut 3. In FIG. 2, the spring device is shown mounted in the lock nut, while FIG. 3 shows only a through hole in which the spring device is accommodated, and FIG. 4 is an exploded view showing the individual components of the spring device spaced-apart from each other.

The above-mentioned hole, which extends axially through the lock nut 3, and which generally is designated 13, includes, on one hand, a front or inner section 14 that opens in the end surface 7 turned inward of the lock nut and, on the other hand, a rear section 15, which via a widened countersink 16 opens in the rear or outward end surface 8 of the lock nut. In the example, the front hole section 14 has a diameter that is greater than the diameter of the hole section 15, the countersink 16 in turn having a greater diameter than the section 15. The inner surface of the front hole section 14 is smooth and cylindrical, while the rear hole section 15 along the entire length thereof is formed with a female thread 17.

The active component of the spring device 12 (see FIG. 4) is a compression spring 18 that acts between a front press body 19 and a rear stop or support body 20. In the exemplified embodiment, the press body 19 is composed of a suitably cylindrical pin having a flange 21, against which the front end of the compression spring 18 may be urged. The support body 20 is in the form of a piston which, in addition to a cylindrical envelope surface 22, has a suitably planar back side 23, as well as a front side 24, in which a central seat 25 opens, a rear end of the press body 19 engaging the seat. A screw 26 may be tightened in the hole section 15 with the male thread 27 thereof in engagement with the female thread 17. A head 28 of the screw is housed in the countersink 16. A Seeger ring 29 has the purpose of holding the different spring components in place in the hole 13.

In the shown, preferred embodiment of the invention, the compression spring 18 is a cup spring that includes a plurality of cups 30, 31, arranged in a united set. A number of first cups 30 in the set are turned with their small ends pointing in an opposite direction to the small ends of the other cups 31. More precisely, the cups 30 are placed in such a way that the small ends point to the left in FIG. 5, while the small ends of the cups 31 point to the right. In such a way, the two intermediate cups will have contact with each other along the outer, peripherical edges thereof, while the two outermost cups are pressed with the internal edges thereof against, on one hand, the flange 21 of the press body 19 and, on the other hand, the front surface 24 of the piston 20.

The support body 20, the spring 18, the press body 19, and the Seeger ring 29 are, upon mounting, inserted in proper order in the hole section 14, while the screw 26 is inserted from behind in the threaded hole section 15. The Seeger ring 19 has only the purpose of holding the spring components 20, 18, 19 in place in the hole section 14.

In the drawings, only one individual spring device 12 is shown. However, in practice, the lock nut 3 is made with a plurality of peripherical spring devices which are spaced-apart and arranged in a circular rim formation. For instance, the lock nut may include eight equidistantly spaced-apart spring devices along the circumference thereof.

When the roll rings 4 and other rings 5, 6 have been applied to the roll shaft 1, as is shown in FIG. 1, the lock nut 3 is tightened on the male thread 10. More precisely, the lock nut is tightened by a considerable pressure against the tightening ring 6. When the lock nut has reached a maximally tightened end position, the spring devices 12 are activated, more precisely by the fact that the individual screw 26 is screwed-in a distance in the hole. As a consequence of the free front end of the press body 19 being urged against the tightening ring 6, the compression spring 18 will then be compressed, more precisely by the fact that the piston moves in the forward direction in the hole section. When the piston by way of the screw reaches a position in which the desired spring prestress has been achieved, the tightening of the screw is terminated. Thereafter, the roll is ready to be taken into operation.

During operation, the different rings of the roll shaft are exposed to dynamic stresses that in an effective way are carried by the compression springs in the different spring devices. More precisely, the individual spring forces are transferred to the common tightening ring 6 in which they are distributed so that the same will act with an even, high pressure against the adjacent roll ring 4. Because the compression springs in the described way are made in the form of powerful cup springs, a dynamic spring action is attained and maintained during long working operations. However, if the spring force eventually is reduced, readjustment may be effected, viz. by additional tightening of the screws 26 so as to press in the pistons additionally into the holes. In such a way, the springs are compressed afresh to the desired degree of prestress.

An important advantage of the roll according to the invention, and the spring arrangement included therein, is that the spring prestress between the rings in a simple way may be held reliably high. This in turn guarantees that the rings do not slip in relation to each other.

Another significant advantage is that the means being necessary for the spring prestress, do not occupy any part of the roll width, i.e., the available space between the stop rings 2, 3. The invention is not limited only to the embodiment described above and shown in the drawings. Thus, it is feasible to arrange the described spring devices in the fixed stop ring 2 instead of in the lock nut 3. It is even possible to arrange spring devices in the fixed stop ring as well as the movable lock nut.

The presently disclosed embodiments are considered in all respects to be illustrative and not restrictive. The scope is indicated by the appended claims, rather than the foregoing description, and all changes that come within the meaning and range of equivalents thereof are intended to be embraced.

The invention claimed is:

1. A roll comprising:
   a drivable roll shaft;
   two axially spaced-apart stop rings, one of the stop rings is fixed, and the other of the stop rings is a lock nut; and
   a plurality of other rings, one or more of said other rings being mounted on the shaft between the stop rings;
   wherein at least one of said stop rings comprises a spring device housed in a through hole extending axially and opening in opposite end surfaces of the at least one of said stop rings, said spring device comprising a mechanical compression spring acting between a front press body that is movable through an opening of said hole in order to constantly pass on a spring force generated by the compression spring to one or more of said other rings and a support body, wherein said support body during operation of the roll assumes a fixed position in relation to the at least one of the stop rings, said support body being adjustable when not in operation by way of an adjusting member to alter the stress on the compression spring, wherein the press body is a pin having a flange against which the compression spring is urged for placing a portion of the press body into compression;
   wherein a rear end of the press body is inserted in a seat in a front side of the support body.

2. The roll according to claim 1, wherein a plurality of the spring devices are housed in a stop ring in the form of a lock nut, and wherein between the lock nut and a roll ring, a tightening ring is arranged for distributing the spring forces of the individual spring devices along the roll ring, the tightening ring having an outer diameter greater than the diameter of a circular rim formation in which the spring devices are placed.

3. A ring for a roll, comprising:
   a spring device housed in a through hole extending axially and opening into opposite end surfaces of the ring;
   said spring device comprising a mechanical compression spring acting between a front press body that is movable through an opening of said hole in order to constantly pass on a spring force generated by the compression spring and a support body which during operation assumes a fixed position in relation to the ring, but which is adjustably movable by way of an adjusting member in order to alter the stress on the compression spring, wherein the press body is a pin having a flange against which the compression spring is urged for placing a portion of the press body into compression;
   wherein a rear end of the press body is inserted in a seat in a front side of the support body.

4. The ring according to claim 3, wherein the press body, the compression spring and the support body are accommodated in a front section of the hole, while the adjusting member is accommodated in a rear section of the hole and accessible from behind.

5. The ring according to claim 3, wherein the support body is a piston having a back side against which the adjusting member is urged.

6. The ring according to claim 4, wherein the front hole section has a diameter that is greater than a diameter of the rear hole section.

7. The ring according to claim 4, wherein the adjusting member is a screw having a male thread engaging an internal female thread formed in the rear hole section of the ring.

8. The ring according to claim 3, wherein the compression spring is a cup spring including a set of several cups.

9. The ring according to claim 8, wherein one or more first cups are turned with their small ends pointing in an opposite direction to the small ends of one or more second cups.

10. The ring according to claim 9, wherein two cups in the center are pressed with the great ends thereof facing each other, the small ends of the cups pointing outward and being urged against the flange of the press body, as well as the front surface of the support body.

11. The ring according to claim 3, further comprising a plurality of peripherally spaced-apart spring devices arranged in a circular rim formation.

* * * * *